US007988926B2

(12) United States Patent
Schmidt-Ihn et al.

(10) Patent No.: US 7,988,926 B2
(45) Date of Patent: Aug. 2, 2011

(54) HYDROGEN-CONSUMING SYSTEM AND METHOD FOR THE OPERATION THEREOF

(75) Inventors: Eberhard Schmidt-Ihn, Esslingen (DE); David Wenger, Ulm (DE)

(73) Assignee: Daimler AG, Stuttgart (DE)

( * ) Notice: Subject to any disclaimer, the term of this patent is extended or adjusted under 35 U.S.C. 154(b) by 339 days.

(21) Appl. No.: 12/290,115

(22) Filed: Oct. 27, 2008

(65) Prior Publication Data

US 2009/0095016 A1 Apr. 16, 2009

Related U.S. Application Data

(63) Continuation-in-part of application No. PCT/EP2007/003820, filed on Apr. 30, 2007.

(30) Foreign Application Priority Data

Apr. 28, 2006 (DE) ........................ 10 2006 020 392

(51) Int. Cl.
*B01J 19/00* (2006.01)
*B01J 8/02* (2006.01)
*F28D 15/00* (2006.01)

(52) U.S. Cl. ........ 422/198; 422/200; 422/211; 422/212; 165/104.12

(58) Field of Classification Search .................. 422/198, 422/200, 211, 212; 165/104.12
See application file for complete search history.

(56) References Cited

U.S. PATENT DOCUMENTS 6,651,701 B2 11/2003 Kuriiwa et al.
6,725,672 B2 * 4/2004 Shimada et al. .............. 62/48.1
2002/0100518 A1 8/2002 Kuriiwa et al.
2003/0049501 A1 3/2003 Fujita
2005/0013770 A1 1/2005 Schulz et al.
2005/0079397 A1 4/2005 Winkelmann
2005/0130002 A1 6/2005 Kuriiwa et al.
2005/0191235 A1 9/2005 Vajo et al.

* cited by examiner

*Primary Examiner* — Walter D Griffin
*Assistant Examiner* — Lessanework Seifu
(74) *Attorney, Agent, or Firm* — Klaus J. Bach

(57) ABSTRACT

In a hydrogen consuming system and a method for the operation thereof wherein the system comprises a hydrogen-consuming unit and a hydrogen storage arrangement comprising a compressed gas storage part and a solid material storage part and a cooling circuit with a radiator extending through the solid material storage part and the consuming unit, hydrogen bypass lines are provided for the solid material storage part and for the hydrogen consuming unit together with control valves for selectively by-passing the solid material storage part and the hydrogen consuming unit.

12 Claims, 5 Drawing Sheets

10
16
22
26
12
30
20
24
18
28

10
16
12
22
26
30
20
24
18
28

9
11
6
CHG
16
7
8
MeH
18
1
2
3
5
4
BZ
30

MeH
18
BZ
30
31
32
33
34
35
36
37
38

MeH
18
BZ
30
31
32
33
34
35
36
37
38

MeH
18
36
35
34
32
BZ
37
33
30
38
31

MeH
18
36
35
34
32
BZ
37
33
30
38
31

MeH
18
BZ
30
31
32
33
34
35
36
37
38

HYDROGEN-CONSUMING SYSTEM AND METHOD FOR THE OPERATION THEREOF

This is a Continuation-In-Part Application of pending International patent application PCT/EP2007/003820 filed Apr. 30, 2007 and claiming the priority of German patent application 10 2006 020 392.5 filed Apr. 28, 2006.

BACKGROUND OF THE INVENTION

The invention relates to a hydrogen-consuming system with a hydrogen-consuming unit and a hydrogen storage system including a hydrogen pressure reservoir and a solid material reservoir and to a method for the operation of such a system.

It is known to store hydrogen either in gaseous form in pressure storage tanks at several hundred bar pressure or in liquid form at cryogenic temperatures in special cooling tanks. Solid material reservoirs are also known, in which the hydrogen can be stored in a solid and released again under defined conditions. However, the storage material is only capable of storing a few percent of its own weight of hydrogen. Such solid material reservoirs are therefore heavy in comparison with pressurized gas reservoirs of the same volume in which gaseous hydrogen is stored under high pressure.

US 2005/0013770 A1 discloses a hybrid reservoir for hydrogen which provides at least two different types of storage reservoirs for hydrogen in a common housing, namely storage in a solid, storage as a compressed gas or storage of hydrogen in liquid form. In one development proposed therein, a solid material reservoir concentrically surrounds a liquid hydrogen storage area.

U.S. Pat. No. 6,651,701 B2 discloses a storage system having a storage part holding gaseous hydrogen and a storage part holding hydrogen stored in a solid reservoir. Depending on the pressures or the available quantity of hydrogen in the one storage part, the other storage part is connected in order to provide hydrogen for the operation of a hydrogen-consuming unit.

Published patent application US 2003/0049501 A1 discloses a hydrogen-consuming system with a fuel cell system as the hydrogen-consuming unit and an associated method for the operation thereof, said system in particular being a fuel cell vehicle. The fuel cell system is provided with a hydrogen storage system comprising a pressure reservoir and a solid reservoir which adsorbs hydrogen exothermically and desorbs it endothermically. The fuel cell system is coupled in parallel via a hydrogen line system with the pressure reservoir and the solid reservoir, a line branch departing from the solid reservoir with a shut-off valve arranged therein joining together with a line branch coming from the pressure reservoir, in which line branch there are a shut-off valve and a pressure-regulating valve, at a junction, from which a supply line leads to the fuel cell system, in which supply line there are a further pressure regulating valve and a further shut-off valve. A cooling circuit is additionally provided, to which are coupled the fuel cell system and the solid reservoir and a radiator, for example a conventional vehicle radiator. The solid reservoir and the radiator are here arranged in parallel branches of the cooling circuit, which are joined together to a line portion leading to the fuel cell system, a regulating valve being arranged in the solid reservoir cooling circuit branch and a radiator bypass line with associated bypass valve being connected in parallel to the radiator. Depending on the operating state of the fuel cell vehicle and in particular of the fuel cell system, hydrogen can be supplied to the fuel cell system from the pressure reservoir or from the solid reservoir and to the solid reservoir from the pressure reservoir. Moreover, the coolant in the cooling circuit can be passed in a controllable quantity via the solid reservoir and the coolant not passed via the solid reservoir may returned to the fuel cell system via the radiator or past the latter via its bypass line. This is intended, in addition to normal operation, also to enable a fuel cell heating mode, in which the coolant is heated by the solid reservoir, which is supplied with hydrogen from the pressure reservoir for this purpose and, bypassing the radiator, is conducted to the fuel cell system. In the normal state at operating temperature, the coolant can transfer heat from the fuel cell system to the solid reservoir in order to assist the endothermic hydrogen release process therein. Switching between the different modes of operation is dependent on a hydrogen pressure sensor on the solid reservoir and a coolant temperature sensor on the fuel cell system.

It is the principal object of the present invention to provide a hydrogen-consuming system with an optimized hydrogen supply and an efficient method for the operation of the system, the hydrogen storage system permitting an elevated hydrogen storage density and having a tolerable weight.

SUMMARY OF THE INVENTION

In a hydrogen consuming system and a method for the operation thereof wherein the system comprises a hydrogen-consuming unit and a hydrogen storage arrangement comprising a compressed gas storage part and a solid material storage part and a cooling circuit with a radiator extending through the solid material storage part and the consuming unit, hydrogen bypass lines are provided for the solid material storage part and for the hydrogen consuming unit together with control valves for selectively by-passing the solid material storage part and the hydrogen consuming unit.

According to the invention, hydrogen is drawn in certain operating phases from the compressed gas or the solid material absorber storage part depending on the thermal requirements of the hydrogen storage system and/or of the hydrogen-consuming unit. In this manner, it is on the one hand possible to take advantage of a weight saving in the case of a predetermined installation space by a preferred combination of a solid material reservoir and a pressurized gas reservoir and, on the other hand, to address the cooling and heating problems of the hydrogen storage system and the hydrogen-consuming unit in an advantageous manner by matching system-internal heating and cooling sources to one another. The pressurized gas reservoir is preferably a high pressure reservoir which is designed for storing gas under pressures of several hundred bar. The pressurized gas reservoir favorably comprises a housing of, for example, steel, aluminum or plastics, which is preferably enclosed, wrapped, in particular, with carbon fiber material. The storage parts may act themselves as a heating or cooling source for the hydrogen-consuming unit. A smooth transition is advantageous when switching over from one storage part to the other for drawing hydrogen, i.e. there is conveniently a transitional phase between operating states in which only the one or the other storage part is supplying hydrogen. During the transitional phase, both storage parts may supply hydrogen. The hydrogen-consuming unit may be a fuel cell or a fuel cell system, or also a combustion engine which burns hydrogen as fuel. It is particularly preferred to use the hydrogen storage system in a fuel cell vehicle which obtains its drive energy from a fuel cell system.

Favorable storage materials which are suitable for such preferred solid reservoirs are in principle materials with an adsorptive action such as carbon structures, organometallic "framework" materials with intrinsic porosity and oxides, such as for instance titanium or silicon oxides. Preference is furthermore given to materials with chemical binding of the hydrogen, such as for instance modified complex hydrides, for example based on alanates, hydridoborates, also amide/hydride systems, magnesium and the alloys thereof, modified aluminum hydrides, aminoboranes, metal hydrides, for example modified AB2, AB5 alloys. Particular preference is given to materials displaying endothermic hydrogen release enthalpy in the range from 20-30 kJ/(mol $H_2$). Organic materials, such as, for example, polymers, are also conceivable. The storage materials may be used in the form of pellets, powder, granular product and the like. The storage material may, however, also undergo automatic pelletization, granulation and the like under operating conditions.

According to a corresponding aspect of the invention, the hydrogen-consuming system comprises a cooling circuit to which the hydrogen-consuming unit, the solid material reservoir and a radiator are coupled in a specific manner, a radiator bypass line being connected in parallel to the radiator. The solid reservoir is connected in the cooling circuit in series with the radiator and an associated bypass line is also connected parallel to the solid material reservoir and/or the hydrogen-consuming unit. This creates the prerequisite for establishing different operating modes of the cooling circuit depending on the instantaneous operating requirements of the hydrogen-consuming system.

It is accordingly possible, for example by an appropriate operating method, to implement a hydrogen-consuming cooling mode, in which serial flow of the coolant is established from the hydrogen consumer, i.e. the hydrogen-consuming unit, via the radiator and via the solid reservoir, and hydrogen is drawn for the hydrogen consumer from the solid reservoir, which consequently takes up heat from the coolant.

In a further operating method according to the invention, a refueling or recharging mode is implemented for the hydrogen-consuming system of this design, in which the hydrogen is fed into the solid reservoir and a serial coolant flow is established from the solid reservoir through the radiator while bypassing the hydrogen consumer. This makes it possible when required to recharge the solid reservoir while dissipating heat via the radiator without subjecting the hydrogen consumer to heat.

A further aspect of the invention relates to the supply of hydrogen to the hydrogen consumer. In a hydrogen-consuming system of a corresponding design, the solid reservoir is arranged to this end in series in a hydrogen feed line leading from the pressure reservoir to the hydrogen consumer. Alternatively, the hydrogen consumer is coupled in parallel to the solid reservoir and the pressure reservoir in such a manner that a cut-off valve and a pressure-reducing valve are in each case provided in the two associated line branches to the solid reservoir and to the pressure reservoir. The associated hydrogen line system may furthermore comprise a refueling port, which opens adjacent to a cut-off valve for the pressure reservoir into a line portion departing from the pressure reservoir. The refueling port enables convenient external hydrogen feed to the hydrogen storage system.

With to a preferred combination of a pressurized gas reservoir with a solid reservoir, a higher storage capacity can be achieved for a given installation volume with no more than a moderate increase in weight, which is highly favorable for vehicle use. Thanks to an appropriately designed control system, the hydrogen can be drawn as desired from one of the two storage parts. In such an embodiment of the invention, the solid reservoir has with a storage capacity of at most approx. 20%, in particular at most approx. 10% and preferably at most approx. 5%, that of the pressure reservoir, such that there is only a small increase in weight.

Hydrogen may preferably be supplied from the first storage part to the second storage part in order to generate heat with the second storage part if hydrogen is taken up exothermically in the second storage part. In the second storage part, hydrogen is then for example exothermically taken up, if the storage material used therein adsorbs or absorbs hydrogen exothermically. The heat from the second storage part may, if required, be supplied to the hydrogen-consuming unit. A rapid rise in the temperature of the hydrogen storage system and/or of the hydrogen-consuming unit, in particular in a fuel cell system, is for example advantageous in the cold season of the year. A solid reservoir with an appropriate storage material which takes hydrogen up exothermically is provided for this purpose.

Alternatively, hydrogen may be supplied from the first storage part to the second storage part in order to consume heat with the second storage part if hydrogen is taken up endothermically in the second storage part. In the second storage part, hydrogen is then for example endothermically taken up, if the storage material used therein adsorbs or absorbs hydrogen endothermically. Heat from the hydrogen-consuming unit may, for example, then preferably be supplied to the second storage part, such that the hydrogen-consuming unit is cooled. A solid reservoir with an appropriate storage material which takes hydrogen up endothermically is provided for this purpose.

In an advantageous method step, in the event of the hydrogen-consuming unit hydrogen having a cooling requirement, hydrogen may be drawn from the second storage part if the second storage part releases hydrogen endothermically. In a preferred fuel cell vehicle, this is the case, for example, when the fuel cell system is to deliver a peak load, for instance when going uphill, preferably at an elevated external temperature and low speed of the fuel cell vehicle, when heat dissipation to the surroundings is particularly inefficient due to the slight temperature differences. Cooling under heavy loads is problematic, especially when using polymer electrolyte membrane fuel cells, which are operated at operating temperatures of below 100° C. Due to the slight temperature differences relative to the surroundings, it is difficult to dissipate the waste heat from the fuel cell system and large radiator areas are necessary. The performance of the fuel cell system is limited by this cooling problem, especially at elevated external temperatures. When using the mode of operation according to the invention, the load on the radiator of a conventional fuel cell vehicle may be relieved by up to 25%, or typically by 20 kW at peak load.

Particularly preferred storage materials in the second storage part are those solids which release hydrogen endothermically, with storage materials having an enthalpy in the range from 10-40 kJ/(mol $H_2$), preferably of 20-30 kJ/(mol $H_2$) being particularly favorable. Metal hydrides or other appropriate solids which release hydrogen with uptake of heat are, for example, favorable.

Furthermore, according to another advantageous method step, the hydrogen-consuming unit may be started by drawing hydrogen from the first storage part, with hydrogen being stored in gaseous form under pressure in the first storage part. Due to the principle on which it is based, there is no cold starting problem with the hydrogen stored in the pressurized gas storage part. Any problems with cold starting and/or dynamic response of the second storage part, which is not a pressurized gas reservoir, but instead preferably a solid reservoir, can simply be bypassed. During the starting process, hydrogen may optionally advantageously be passed from the first storage part into the second storage part in order to heat up the second storage part. The second storage part may then be used, if it is ready for operation, while the hydrogen-consuming unit is already in operation.

During normal operation, hydrogen may advantageously be drawn from the first or the second storage part depending on the quantity available.

In a favorable further development, hydrogen may be drawn from the first or second storage part depending on ambient conditions and/or anticipated thermal requirements on the hydrogen-consuming unit and/or the hydrogen storage system. The interaction of the different storage parts may be further improved by a predictive mode of operation.

The invention will become more readily apparent from the following thereof on the basis of the accompanying drawings:

DESCRIPTION OF PARTICULAR EMBODIMENTS

Figure 1:
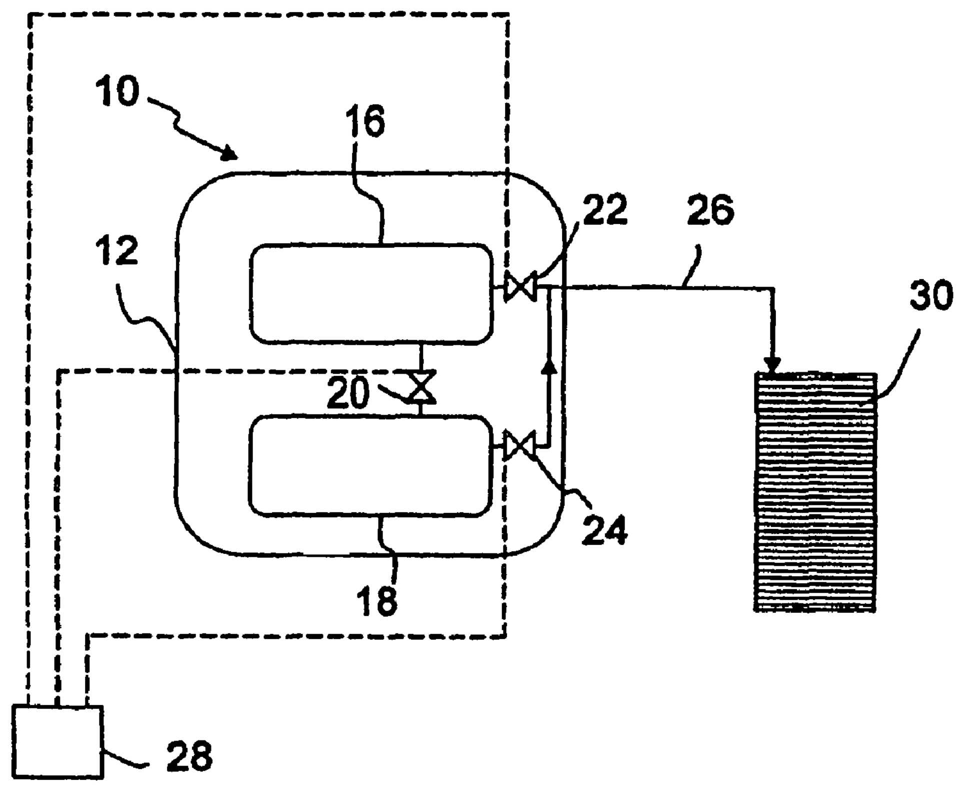
FIG. 1 is a schematic block diagram of a hydrogen-consuming system with a hydrogen consuming and a hydrogen storage system.

The hydrogen-consuming system shown in FIG. 1 comprises a hydrogen storage system 10, which supplies a hydrogen-consuming unit 30 with hydrogen. The hydrogen-consuming unit 30 is for example a fuel cell system in a fuel cell vehicle representing a hydrogen-consuming system. The mode of operation of fuel cells and fuel cell systems is sufficiently well known and thus does not need to be explained further here.

The hydrogen storage system 10 comprises a first storage part 16 and a second storage part 18. The first storage part 16 is preferably a pressurized gas reservoir, in which hydrogen is stored in gaseous form under a pressure of, for example, several hundred bar. The second storage part 18 is preferably a solid material reservoir, in which hydrogen is absorbed with release of heat and hydrogen may be released with uptake of heat. The first storage part 16 and the second storage part 18 are arranged, for example, in a common housing 12. They may, however, also be arranged separately from one another in the hydrogen storage system 10.

Hydrogen passes via a line 26 from the hydrogen storage system 10 to the hydrogen-consuming unit 30. The first storage part 16 may be shut off from the line 26 by a valve 22, the second storage part 18 by a valve 24. The two storage parts 16, 18 are connected together via a valve 20. The valves 20, 22, 24 may be actuated with an open- or closed-loop control unit 28 via control lines which are not marked. The diagram is simplified. As is obvious to a person skilled in the art, it is possible to provide sensors for pressure, temperature and the like and further means for monitoring the state of the storage parts 16, 18, or for purposefully effecting release or uptake of hydrogen.

In predetermined operating phases, hydrogen is drawn from the first or the second storage part 16, 18 depending on thermal requirement of the hydrogen storage system 10 and/or the hydrogen-consuming unit 30.

At low external temperatures, in particular below the freezing point, hydrogen may be introduced from the first storage part 16, which is a pressurized gas reservoir, into the second storage part 18, which is preferably a solid material reservoir. Withdrawal of hydrogen from the solid reservoir releases heat whereby the whole system is heated up. This is advantageous for start-up operating phases, particularly in winter.

When a vehicle equipped with fuel cells for example is going uphill, which involves a high power output from the hydrogen-consuming unit 30 and the generation of a corresponding quantity of waste heat, hydrogen is preferably drawn exclusively from the second storage part 18. This proceeds under endothermic conditions, such that heat from the entire system may be dissipated and absorbed by the second storage part 18. In this manner, the load on a vehicle radiator of the fuel cell vehicle is relieved, even when the vehicle is traveling uphill at elevated external temperatures and low vehicle speed.

During the operating phase for starting the hydrogen-consuming unit 30, hydrogen is preferably drawn exclusively from the first storage part 16 configured as a pressurized gas reservoir, thereby avoiding the problems of cold starting and a dynamic response of a solid material reservoir for hydrogen.

In addition, during the starting process, hydrogen may be passed from the first storage part 16 into the second storage part 18 in order to heat up the second storage part 18.

To provide an optimized compromise between elevated storage capacity and elevated weight, the solid reservoir 18 is designed with a storage capacity of preferably at most approx. 20%, more preferably of at most approx. 10%, specifically for example of approx. 5% of the storage capacity of the pressurized gas reservoir 16.

Figure 2:
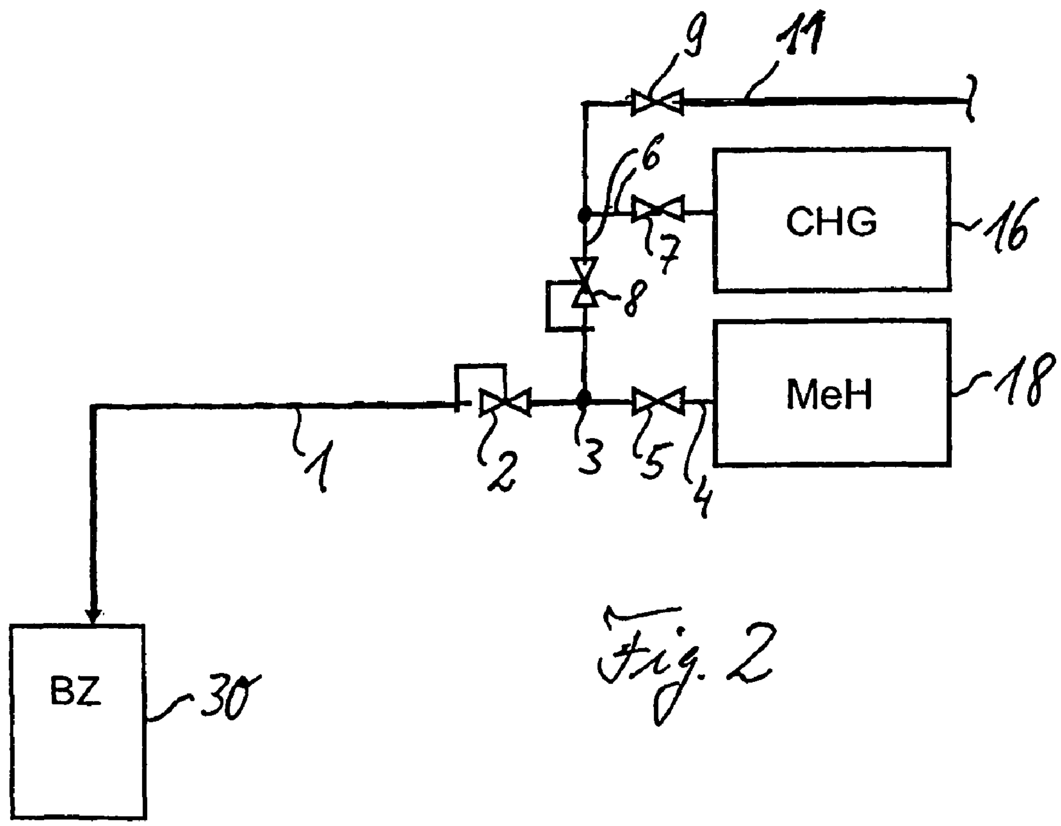
FIGS. 2 to 4 show each in a block diagram alternative embodiments of a hydrogen supplying system component of a hydrogen-consuming system and FIGS. 5 to 9 are in each case a block diagram of a coolant circuit of a hydrogen-consuming system in different modes of operation.
Figure 3:
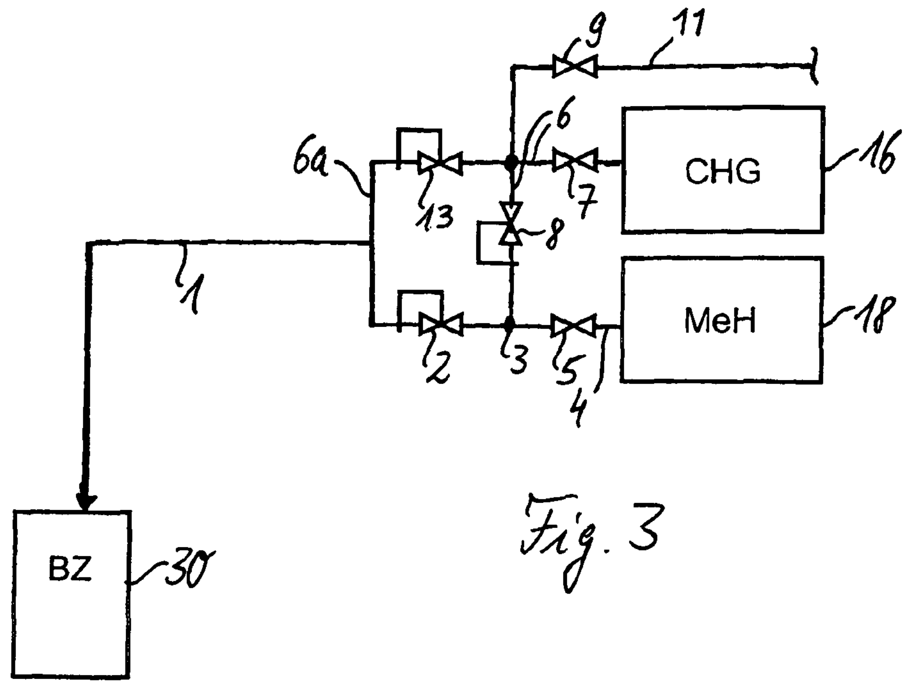
Figure 4:
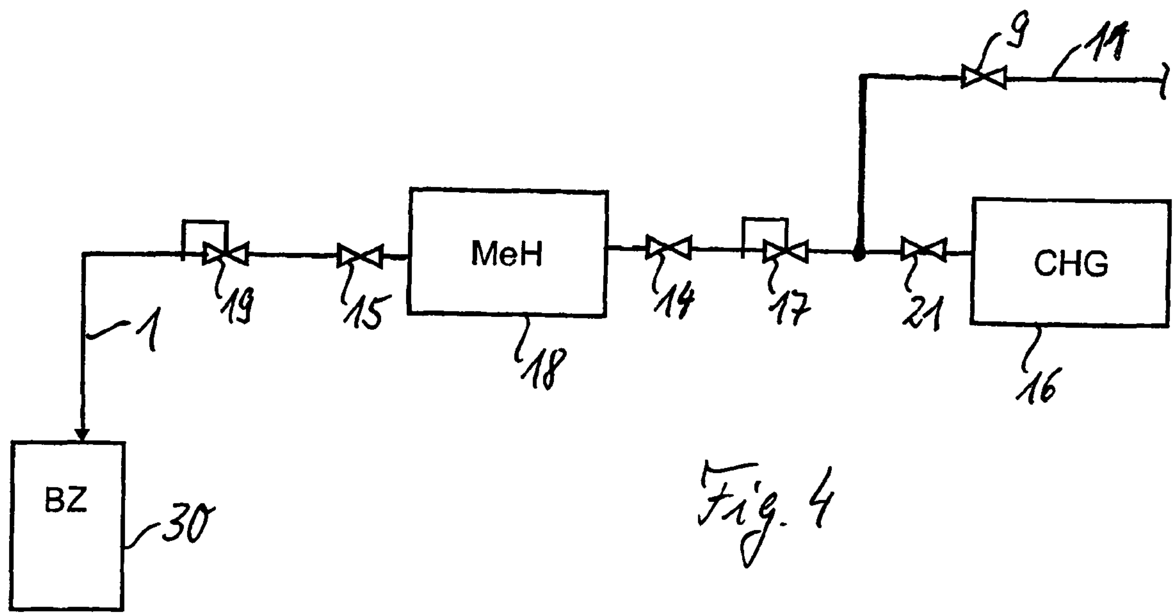

FIGS. 2 to 4 illustrate advantageous, alternative embodiments of the hydrogen supply system for the hydrogen-consuming unit 30 as a complement or alternative to the hydrogen supply components shown in FIG. 1. For clarity's sake, identical or functionally equivalent elements are provided with identical reference numerals, and in this respect reference may also be made to the above explanations regarding FIG. 1.

In the supply system of FIG. 2, a hydrogen line system comprises a feed line 1 leading to the hydrogen consumer 30, such as a fuel cell system (BZ), in which feed line 1 there is a pressure-reducing valve 2, upstream of which, at a junction 3, a line branch 4 coming from the solid reservoir 18, in this case a metal hydride reservoir. (MeH), with associated shut-off valve 5 joins with a line branch 6 departing from the pressure reservoir (CHG) 16, in which line branch 6 are arranged in series a cut-off valve 7 and a pressure-reducing valve 8. Between the shut-off valve 7 and the pressure-reducing valve 8, there opens into this line branch 6 an external refueling line 11, likewise provided with a shut-off valve 9, via which the hydrogen storage system consisting of pressure reservoir 16 and solid reservoir 18 may be supplied with hydrogen from the outside. It is also possible to supply hydrogen directly to the fuel cell system 30 from the outside via this refueling line 11.

FIG. 3 shows a variant of the supply system of FIG. 2, in which, as the only difference, an additional line branch **6*a* with pressure-reducing valve 13 arranged therein departs from the mouth of the external refueling line 11 into the line branch 6 departing from the pressure reservoir 16 and opens downstream of the pressure-reducing valve 2 into the feed line 1. As a result, two parallel line branches, each having a shut-off valve 5, 7 and each having a pressure-reducing valve 2, 13 are formed for the pressure reservoir 16 and the solid reservoir 18, which join together to form the feed line 1, a bypass branch with the pressure-reducing valve 8 connecting the two branches in each case between their shut-off valve 5, 7 and their pressure-reducing valve 2, 13**.

In the variant shown in FIG. 4, the solid reservoir 18 is arranged in series in the feed line 1 leading from the pressure reservoir 16 to the hydrogen consumer 30. Upstream and downstream of the solid reservoir 18, a shut-off, valve 14, 15 and a pressure-reducing valve 17, 19 are in each case arranged in series in the feed line 1. There is a further shut-off valve 21 located at the pressurized gas reservoir port. An external refueling line 11 with associated shut-off valve 9 is in turn provided, which opens into the feed line 1 between the shut-off valve 21 of the pressure reservoir 16 and the adjacent pressure-reducing valve 17.

A person skilled in the art will control the various above-mentioned types of hydrogen flows from and to the individual system components by suitable design of the actuation of the shut-off valves and pressure-reducing valves, this requiring no further explanation. In all three variants of FIGS. 2 to 4, the pressure reservoir 16 and the solid reservoir 18 may be refueled from outside with hydrogen via the refueling line 11. In addition, in all these variants, hydrogen may be conducted from the pressure reservoir 16 to the solid reservoir 18, and likewise in all three variants hydrogen may be supplied from the solid reservoir 18 directly to the hydrogen consumer 30. In the variants of FIGS. 2 and 3, hydrogen may moreover be supplied directly from the pressure reservoir 16 to the hydrogen consumer 30 and, in the variant of FIG. 4, indirectly via the solid reservoir 18.

FIGS. 5 to 9 illustrate the integration of the solid reservoir 18 and of the hydrogen consumer 30 into a cooling circuit with a circulating coolant, as it may for example be provided in a fuel cell vehicle. The cooling circuit comprises a conventional coolant pump 31 and a for example air-cooled radiator 32 of conventional type. In order to bypass the radiator 32, a radiator bypass line 33 with a bypass valve 34 on the output side is connected in parallel with the radiator. In order to bypass the solid reservoir 18, a solid reservoir bypass line 35 with a bypass valve 36 on the output side is connected in parallel with the solid reservoir. In order to bypass the hydrogen consumer 30, a hydrogen consumer bypass line 37 with a bypass valve 38 on the output side is connected in parallel with the hydrogen consumer. The coolant used may be water or any other coolant conventionally used in vehicle cooling circuits.

The cooling circuit of this structure advantageously permits a plurality of different temperature control operating modes for optimum cooling or heating of the hydrogen consumer 30 and/or of the solid reservoir 18, this being addressed in greater detail with reference to FIGS. 5 to 9. Depending on operating mode, different coolant flow paths for the cooling circuit may be established by control of the three bypass valves 34, 36, 38. This is symbolized by corresponding flow arrows and by the flow path which is in each case shut off by the respective bypass valve 34, 36, 38 being represented in the valve symbol by a solid black triangle.

Figure 5:
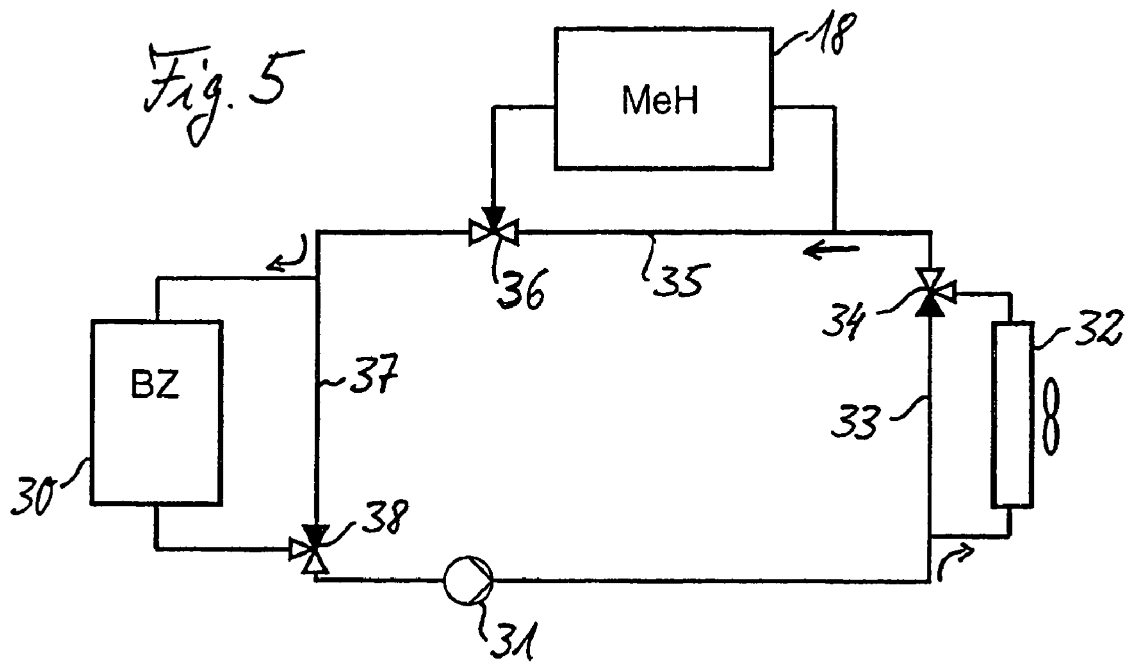

Specifically, FIG. 5 shows the cooling circuit in normal cooling operation, in which the hydrogen consumer 30 is cooled via the radiator 32, the coolant being directed via the solid reservoir bypass line 35 and so bypassing the solid reservoir 18. This mode of cooling operation is established in those cases of operation in which the hydrogen consumer 30 is to be cooled without introducing waste heat from the hydrogen consumer 30 into the solid reservoir 18. This is for example the case in the warmed up system state with the hydrogen consumer 30 being supplied with hydrogen from the pressure reservoir.

Figure 6:
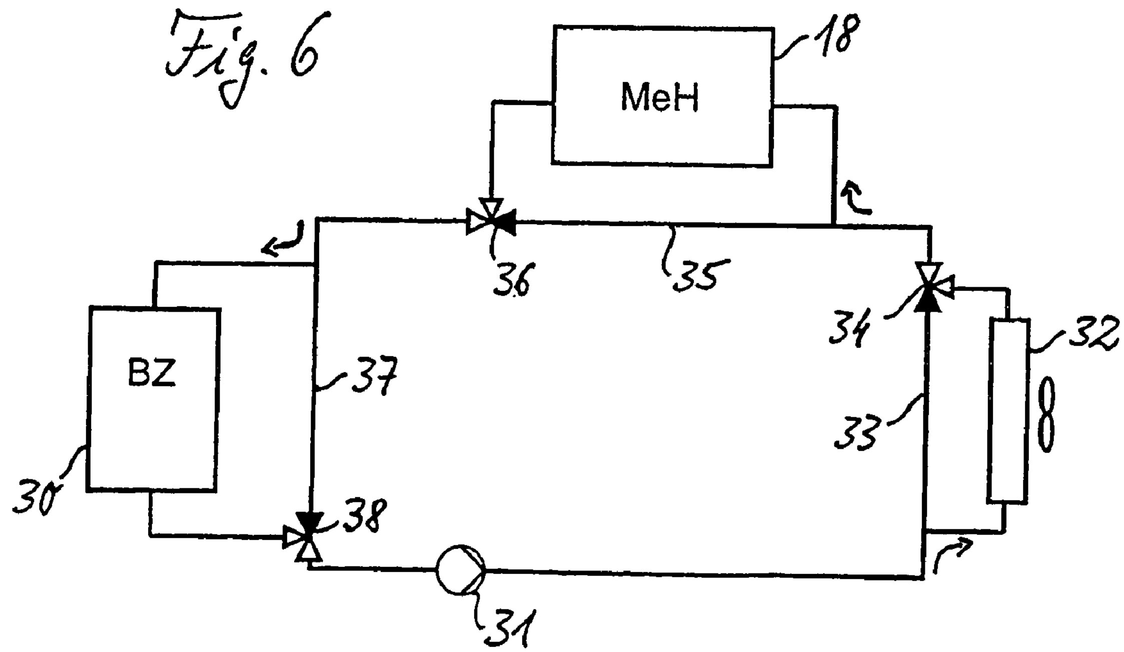

FIG. 6 shows the cooling circuit in a cooling mode, in which the hydrogen consumer 30 is cooled by a coolant flow which is passed in series via the radiator 32 and the solid reservoir 18. As a result, in comparison with the operating mode of FIG. 5, the solid reservoir 18 additionally contributes to cooling the hydrogen consumer 30. Since the solid reservoir 18 may thus contribute to the cooling power of the cooling circuit, in corresponding embodiments of the invention it is possible to design the radiator 32 for a lower cooling power. At the same time, thanks to the uptake of heat, the solid reservoir 18 can release hydrogen which can be supplied to the hydrogen consumer 30. The mode of cooling operation shown in FIG. 6 is convenient, for example, under full load conditions of the fuel cell vehicle at a relatively high external temperature.

Figure 7:
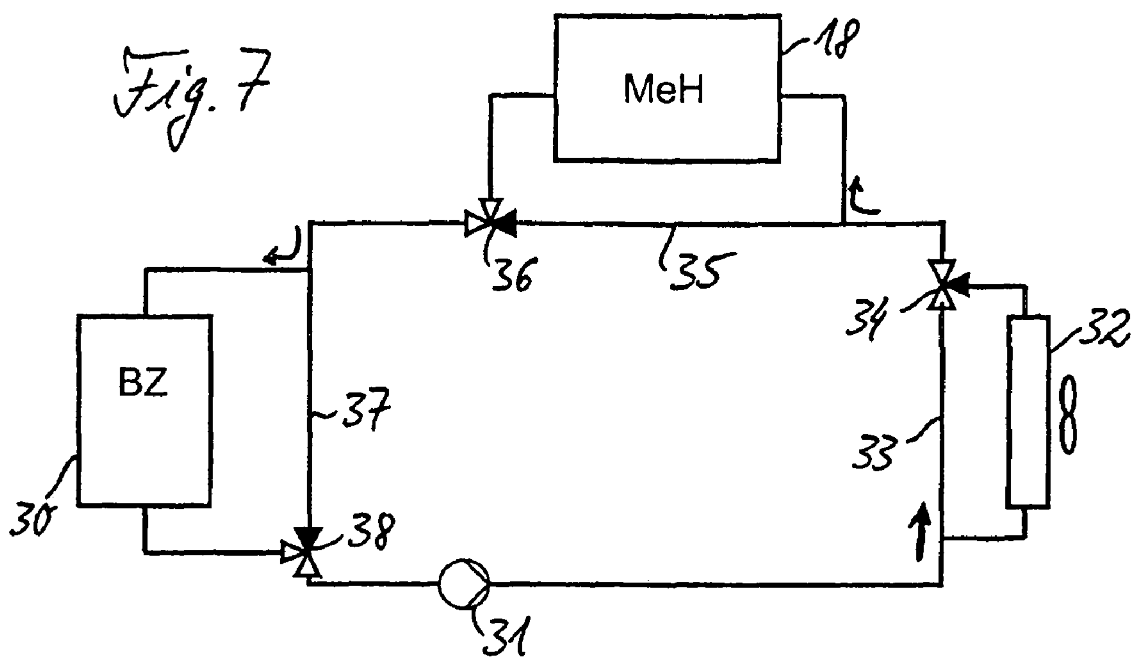

FIG. 7 shows the cooling circuit in a temperature control operating mode for heating the hydrogen consumer 30. To this end, the coolant is supplied, bypassing the radiator 32, to the solid reservoir 18 and passes from there to the hydrogen consumer 30. At the same time, as explained above, hydrogen is supplied to the solid reservoir 18 from the pressure reservoir and/or via the external refueling line. The solid reservoir 18 takes up the supplied hydrogen exothermically, and the coolant transports the resultant heat to the hydrogen consumer 30. This operating mode is suitable, for example, for cold starting of the fuel cell vehicle.

Figure 8:
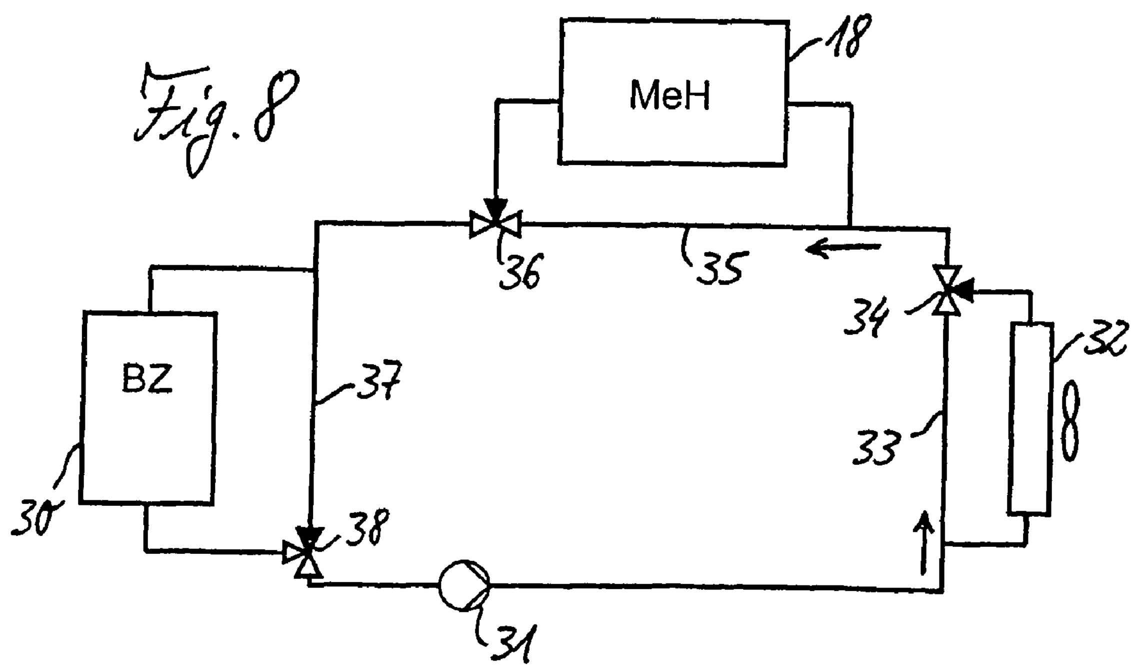

FIG. 8 illustrates a temperature control operating mode for heating the hydrogen consumer 30 without additional heat from the solid reservoir 18. In this case, the coolant circulates in the cooling circuit bypassing both the radiator 32 and the solid reservoir 18. This prevents any heat already introduced into the coolant from the hydrogen consumer 30 and any further waste heat-generating vehicle components, not shown here, from being dissipated via the radiator 32 or the solid reservoir 18. The heat is consequently retained in the cooling circuit and can heat up the hydrogen consumer 30. This cooling circuit setting may be used, for example, from an initial cold start setting according to FIG. 7 for a transitional period until the system reaches the normal operating temperature state.

Figure 9:
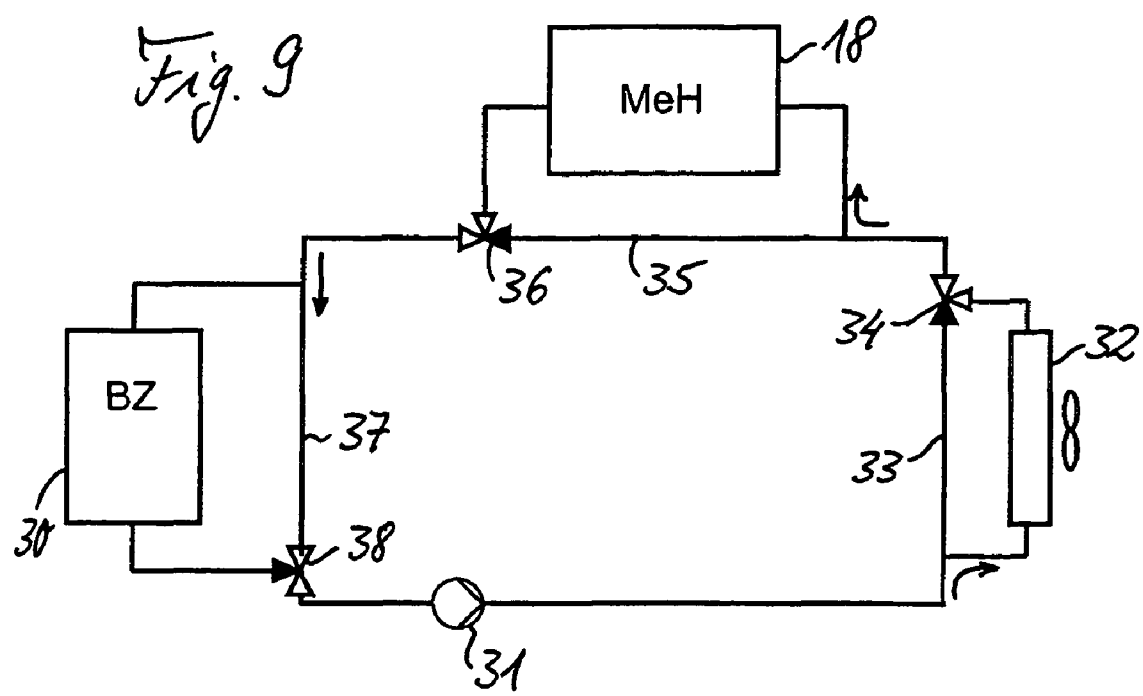

FIG. 9 illustrates cooling of the solid reservoir 18 as a further advantageous possible use of this cooling circuit. In this case, the coolant is passed from the solid reservoir 18, bypassing the hydrogen consumer 30, via the radiator 32, such that it can dissipate heat from the solid reservoir 18 without consequently straining the hydrogen consumer 30. This cooling circuit setting is suitable, for example, in periods during which the solid reservoir 18 is being refueled and is in this way releasing heat, when the hydrogen consumer 30 does not need to be heated. Because it is being actively cooled, the solid reservoir 18 may be more effectively refueled with hydrogen.

As is clear from the exemplary embodiments shown and described above, the invention provides a hydrogen-consuming system and an associated operating method which permit an optimized supply of hydrogen to the hydrogen consumer as desired from a pressure reservoir and/or a solid reservoir and optimized temperature control, matched thereto, of system components, in particular of the hydrogen consumer and the solid reservoir. When in service in vehicles, hydrogen may, for example, be drawn exclusively from the solid reservoir under full load conditions and elevated external temperatures, while in contrast, in the case of elevated load dynamics and low external temperatures, hydrogen may be drawn exclusively from the pressure reservoir. In addition, during cold starting of the system, hydrogen may be transferred from the pressure reservoir to the solid material reservoir in order to utilize its exothermic hydrogen storage characteristic to heat the hydrogen consumer, such as a fuel cell system.

What is claimed is:

1. A hydrogen-consuming system comprising a hydrogen-consuming unit (30), a hydrogen storage system with a pressure reservoir (16) for storing hydrogen under pressure in gaseous form, and a solid material reservoir (18), which takes hydrogen up exothermically and releases it endothermically, and a cooling circuit with which the hydrogen-consuming unit and the solid material reservoir are coupled together with a radiator (32) and a radiator bypass line (33) which is connected in parallel with the radiator (32), the solid material reservoir (18) being connected in the cooling circuit in series with the radiator (32) and one of a solid material reservoir bypass line (35) connected in parallel with the solid material reservoir and a hydrogen consumer bypass line (37) connected in parallel with the hydrogen-consuming unit (30).

2. A hydrogen-consuming system according to claim 1, wherein the hydrogen-consuming unit (30) is coupled to the pressure reservoir (16) and to the solid material reservoir (18) via one of an arrangement, wherein the solid reservoir (18) is arranged in series between the pressure reservoir (16) and the hydrogen-consuming unit (30) and an arrangement, wherein the hydrogen-consuming unit (30) is coupled in parallel to the solid reservoir (18) and the pressure reservoir (16) in each case via a cut-off valve (5, 7) and a pressure-reducing valve (2, 13) and the hydrogen line system comprises an external refueling port (11) which extends via a branch line portion (6) to a cut-off valve (7) for the pressure reservoir (16).

3. The hydrogen-consuming system as claimed in claim 1, wherein the solid material reservoir (18) has a storage capacity of at most 20% of the storage capacity of the pressure reservoir (16).

4. The hydrogen-consuming system as claimed in claim 3, wherein the hydrogen storage capacity of the solid material reservoir (18) is about 10% of the hydrogen storage capacity of the pressure reservoir (16).

5. The hydrogen-consuming system as claimed in claim 2, wherein the solid material reservoir (18) has a storage capacity of at most approx. 20% of the storage capacity of the pressure reservoir (16).

6. A method for the operation of a hydrogen-consuming system including a hydrogen-consuming unit (30), a hydrogen storage system with a pressure reservoir (16) for storing hydrogen under pressure in gaseous form, and a solid material reservoir (18), takes hydrogen exothermically and releases it endothermically, and a cooling circuit with which the hydrogen-consuming unit and the solid material reservoir are coupled together with a radiator (32) and a radiator bypass line (33) which is connected in parallel with the radiator (32), the solid material reservoir (18) being connected in the cooling circuit in series with the radiator (32) and one of a solid material reservoir bypass line (35) connected in parallel with the solid material reservoir and a hydrogen consumer bypass lire (37) connected in parallel with the hydrogen-consuming unit (30), said method comprising the steps of establishing, in a hydrogen consumer cooling mode, a serial coolant flow through the hydrogen consumer (30), the radiator (32) and the solid reservoir (18) and drawing hydrogen for the hydrogen consumer from the solid material reservoir (18).

7. The method for the operation of a hydrogen-consuming system as claimed in claim 6, wherein, in a refueling mode, hydrogen is fed into the solid material reservoir (18) and a serial coolant flow is established through the radiator (32), the solid material reservoir (18) and the hydrogen consumer bypass line (37) bypassing the hydrogen consumer (30).

8. A method for the operation of a system comprising a hydrogen-consuming unit (30) and a hydrogen storage system (10), with at least two different storage mechanisms including at least a first storage part (16) and a second storage part (18), comprising the steps of drawing hydrogen in predetermined operating phases selectively from one of the first and the second storage parts (16, 18) depending on a thermal requirement of the hydrogen storage system (10) and of the hydrogen-consuming unit (30), hydrogen being supplied from the first storage part (16) to the second storage part (18) in order to consume heat within the second storage part (18) when hydrogen is taken up endothermically in the second storage part (18).

9. The method as claimed in claim 8, wherein heat is supplied from the hydrogen-consuming unit (30) to the second storage part (18), if hydrogen is taken up endothermically in the second storage part (18).

10. The method as claimed in claim 8, wherein, for starting the hydrogen-consuming unit (30), hydrogen, stored in gaseous form under pressure in the first storage part (16), is drawn from the first storage part (16).

11. The method as claimed in claim 8, wherein, during normal operation, hydrogen is drawn from either one of the first and the second storage parts (16, 18) depending on the quantity available in the storage parts (16, 18).

12. The method as claimed in claim 11, wherein hydrogen is drawn from the first or second storage part (16, 18) depending on ambient conditions and anticipated thermal requirements of the hydrogen-consuming unit (30) and the state of the hydrogen storage system (10).

* * * * *